(12) United States Patent
David et al.

(10) Patent No.: US 9,726,240 B2
(45) Date of Patent: Aug. 8, 2017

(54) METHOD AND SYSTEM FOR DETECTING AND CLEARING BATTERY POWER FAILURE OF ELECTRIC CLUTCH ACTUATOR

(71) Applicant: Eaton Corporation, Cleveland, OH (US)

(72) Inventors: James David, Portage, MI (US); Bharath Suda, Pune (IN); John Vandervoort, Delton, MI (US); Asheesh Soni, Pune (IN)

(73) Assignee: Eaton Corporation, Cleveland, OH (US)

( * ) Notice: Subject to any disclaimer, the term of this patent is extended or adjusted under 35 U.S.C. 154(b) by 273 days.

(21) Appl. No.: 14/571,813

(22) Filed: Dec. 16, 2014

(65) Prior Publication Data

US 2015/0300428 A1   Oct. 22, 2015

Related U.S. Application Data

(60) Provisional application No. 61/980,066, filed on Apr. 16, 2014, provisional application No. 62/008,087, filed on Jun. 5, 2014, provisional application No. 62/008,089, filed on Jun. 5, 2014.

(51) Int. Cl.
*F16D 48/06*   (2006.01)

(52) U.S. Cl.
CPC .... *F16D 48/064* (2013.01); *F16D 2500/1021* (2013.01); *F16D 2500/1066* (2013.01); *F16D 2500/3028* (2013.01); *F16D 2500/5108* (2013.01); *F16D 2500/5114* (2013.01); *Y10S 903/946* (2013.01)

(58) Field of Classification Search
CPC ............................... F16D 48/06; F16D 48/064
See application file for complete search history.

(56) References Cited

U.S. PATENT DOCUMENTS

| | | | | |
|---|---|---|---|---|
| 3,660,748 A | * | 5/1972 | Clayton | .................. H02J 7/008 320/125 |
| 3,916,376 A | * | 10/1975 | Tuttle | .................. B60R 21/0173 280/735 |
| 2012/0309588 A1 | * | 12/2012 | Ashida | ...................... B60L 3/04 477/7 |
| 2014/0195097 A1 | * | 7/2014 | Yamanaka | ............ B60L 3/0023 701/29.1 |

* cited by examiner

*Primary Examiner* — Jacob S Scott
(74) *Attorney, Agent, or Firm* — Mei & Mark LLP (57) ABSTRACT

Methods and systems for detecting and clearing battery power failure of an electric clutch actuator (ECA) include use of a capacitor connected to the ECA. The capacitor is connected to the ECA such that when the ECA and a battery configured to output a battery voltage are connected together a capacitor voltage matches the battery voltage and when the ECA and the battery are disconnected from one another the capacitor voltage differs from the battery voltage. A loss of battery connection is detected upon a difference between the capacitor voltage and the battery voltage exceeding a threshold.

20 Claims, 7 Drawing Sheets

METHOD AND SYSTEM FOR DETECTING AND CLEARING BATTERY POWER FAILURE OF ELECTRIC CLUTCH ACTUATOR

CROSS-REFERENCE TO RELATED APPLICATIONS

This application claims the benefit of: U.S. Provisional Application No. 61/980,066, filed Apr. 16, 2014; U.S. Provisional Application No. 62/008,087, filed Jun. 5, 2014; and U.S. Provisional Application No. 62/008,089, filed Jun. 5, 2014; the disclosures of which are hereby incorporated in their entirety by reference herein.

TECHNICAL FIELD

The present invention relates to detecting and clearing battery power failure of an electric clutch actuator.

BACKGROUND

An electric clutch actuator (ECA) controls engagement and disengagement of a clutch. For instance, the clutch connects an engine to a transmission of a vehicle powertrain when engaged and disconnects the engine from the transmission when disengaged. The ECA receives power for controlling the clutch from a battery. At times, the level or amount of battery power to the ECA may be too low or too high. The battery power may become too low as a result of loss of battery connection while the ECA is in a motoring mode. Likewise, the battery power may become too high as a result of loss of battery connection while the ECA is in a regeneration mode. Timely detection of such battery power failure of the ECA in either case is desirable.

SUMMARY

An object of the present invention includes detecting battery power failure of an electric clutch actuator (ECA) based on voltage at a capacitor connected between the ECA and a battery that is to provide the battery power.

A further object of the present invention includes detecting re-establishment of proper battery power to the ECA, after battery power failure was detected, based on voltage at the capacitor.

Another object of the present invention includes detecting the battery power of the ECA being too low based on voltage at the capacitor when the ECA is in a motoring mode.

A further object of the present invention includes detecting re-establishment of proper battery power to the ECA, after the battery power was detected to be too low, based on voltage at the capacitor when the ECA is in the motoring mode.

Another object of the present invention includes detecting the battery power to the ECA being too high based on voltage at the capacitor when the ECA is in a regeneration mode.

A further object of the present invention includes detecting re-establishment of proper battery power to the ECA, after the battery power was detected to be too high, based on voltage at the capacitor when the ECA is in the regeneration mode.

In carrying out at least one of the above and other objects, the present invention provides a method for an ECA. The method includes connecting a capacitor to the ECA such that when the ECA and a battery configured to output a battery voltage are connected together a capacitor voltage matches the battery voltage and when the ECA and the battery are disconnected from one another the capacitor voltage differs from the battery voltage. The method further includes detecting a loss of battery connection upon a difference between the capacitor voltage and the battery voltage exceeding a threshold.

In an embodiment, the method further includes detecting re-establishment of the battery connection upon the difference between the capacitor voltage and the battery voltage being less than the threshold for a duration after a loss of battery connection was detected.

In an embodiment, the method further includes detecting re-establishment of the battery connection upon the difference between the capacitor voltage and the battery voltage being less than the threshold and a rate of change of the capacitor voltage being less than a rate threshold for a duration after a loss of battery connection was detected.

In an embodiment, the method further includes detecting re-establishment of the battery connection upon the difference between the capacitor voltage and the battery voltage being less than the threshold and a change of the capacitor voltage caused in response to motor excitation of the ECA being less than a change threshold after a loss of battery connection was detected.

In an embodiment, the method further includes operating the ECA in a motoring mode in which the ECA consumes power such that during loss of battery connection the capacitor voltage falls and detecting a loss of battery connection upon the capacitor voltage falling lower than a low threshold.

In an embodiment, the method further includes operating the ECA in a regeneration mode in which the ECA supplies power such that during loss of battery connection the capacitor voltage rises and detecting a loss of battery connection upon the capacitor voltage rising greater than a high threshold.

Further, in carrying out at least one of the above and other objects, the present invention provides a system having an ECA operable to actuate a clutch. The system further includes a capacitor connected to the ECA such that when the ECA and a battery configured to output a battery voltage are connected together a capacitor voltage matches the battery voltage and when the ECA and the battery are disconnected from one another the capacitor voltage differs from the battery voltage. The system further includes a controller configured to detect a loss of battery connection upon a difference between the capacitor voltage and the battery voltage exceeding a threshold.

In an embodiment, the system further includes a voltage bus configured to provide the battery voltage when the battery is connected to the voltage bus. In this case, the capacitor and the ECA are connected to the voltage bus. The capacitor and the ECA may be connected in parallel to one another to the voltage bus such that the capacitor is connected between the battery and the ECA when the battery is connected to the voltage bus.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
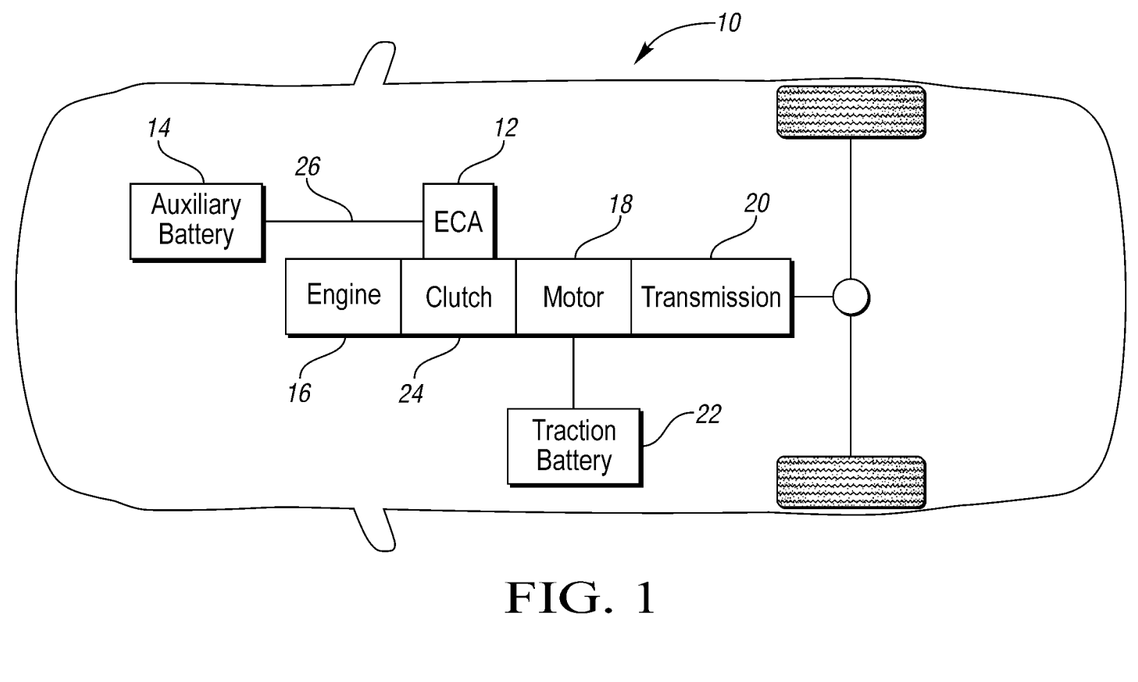
FIG. 1 illustrates a block diagram of an exemplary vehicle powertrain having an electric clutch actuator (ECA) powered by an auxiliary battery in accordance with an embodiment of the present invention.

Referring now to FIG. 1, a block diagram of an exemplary vehicle powertrain 10 having an electric clutch actuator (ECA) 12 powered by an auxiliary battery 14 in accordance with an embodiment of the present invention is shown. Powertrain 10 is an electric hybrid powertrain further including an engine 16, a motor 18, and a transmission 20. Motor 18 is connected to transmission 20 and receives power from a traction battery 22 for providing a motive force to the transmission.

A clutch 24 is between engine 16 and motor 18. ECA 12 controls the engagement (i.e., closing) and disengagement (i.e., opening) of clutch 24. Clutch 24 connects engine 16 to motor 18 when engaged whereby engine 16 is connected to transmission 20 via motor 18. ECA 12 operates in a motoring mode to cause clutch 24 to move from a starting position to a relatively more engaged position. On the other hand, clutch 24 disconnects engine 16 from motor 18 when disengaged whereby engine 16 is disconnected from both motor 18 and transmission 20. ECA 12 operates in a regeneration mode when clutch 24 moves from a starting position to a relatively more disengaged position.

Auxiliary battery 14 is a DC battery. ECA 12 receives DC battery power for controlling clutch 24 from battery 14. In particular, battery 14 provides a battery voltage onto a voltage bus 26. ECA 12 is connected to voltage bus 26 to receive the battery voltage and draw battery power therefrom. The battery voltage to ECA 12 may become too low as a result of loss of battery connection to the ECA while the ECA is in the motoring mode. Correspondingly, the battery voltage to ECA 12 may become too high as a result of loss of battery connection to the ECA while the ECA is in the regeneration mode. The loss of battery connection to ECA 12 occurs whenever ECA 12 or battery 14 becomes disconnected from voltage bus 26. Such disconnection may occur during certain transient or longer term periods. Further, the battery voltage to ECA 12 may become too low as a result of battery 14 not providing sufficient battery power onto voltage bus 26 during certain transient periods, the demand for battery power from other units connected to voltage bus 26 being relatively too high during certain transient periods, etc. As further indicated above, timely detection of such battery power failure of ECA 12 is desirable.

Figure 2:
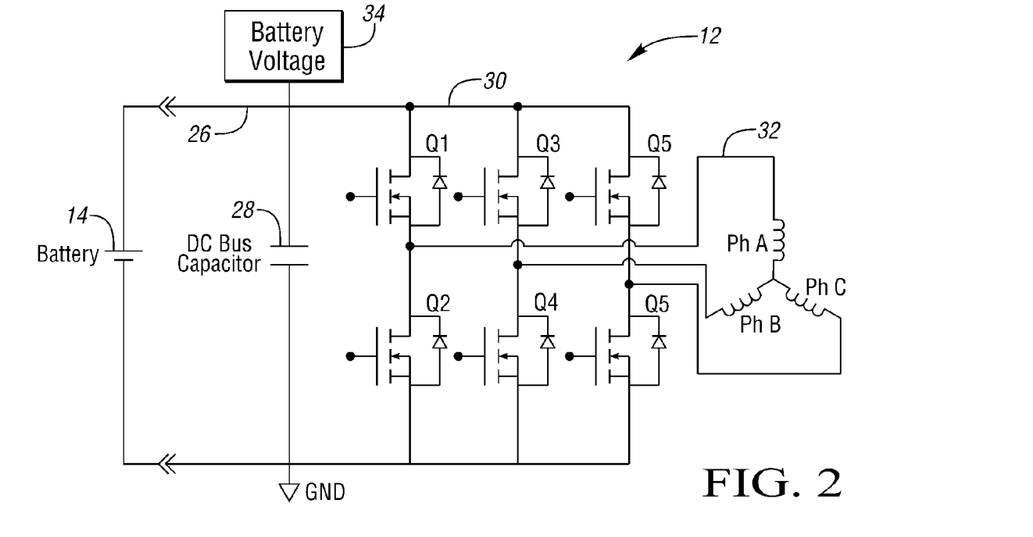
FIG. 2 illustrates a schematic diagram of the ECA, the auxiliary battery, and a capacitor connected together via a voltage bus with the capacitor being connected between the ECA and the auxiliary battery in accordance with an embodiment of the present invention.

Referring now to FIG. 2, with continual reference to FIG. 1, a schematic diagram of ECA 12, auxiliary battery 14, and a capacitor 28 connected together via voltage bus 26 with the capacitor connected between the ECA and the auxiliary battery in accordance with an embodiment of the present invention is shown.

As shown in FIG. 2, ECA 12 includes an inverter 30 and a motor 32. Motor 32 is operable in the motoring mode to cause clutch 24 to move from a starting position to a relatively more engaged position. Motor 32 is operable in the regeneration mode when clutch 24 moves from a starting position to a relatively more disengaged position.

As further shown in FIG. 2, inverter 30 of ECA 12 is connected to voltage bus 26. In the motoring mode, inverter 30 obtains the battery voltage from voltage bus 26, converts the battery voltage into an AC voltage, and provides the AC voltage to motor 32 for the motor to move clutch 24 to a more engaged position. In the regeneration mode, motor 32 acts as a generator and generates an AC voltage from clutch 24 being moved to a more disengaged position. Motor 32 provides the generated AC voltage to inverter 30. Inverter 30 converts the AC voltage to a DC voltage and provides the DC voltage onto voltage bus 26.

Capacitor 28 is connected to a link of voltage bus 26 adjacent to inverter 30 of ECA 12 and is in parallel with inverter 30. As such, capacitor 28 and inverter 30 have the same battery voltage on voltage bus 26. The voltage of capacitor 28 can be measured at a measurement location 34 of the link of voltage bus 26 using a resistor and an analog-to-digital (ADC) converter (not shown).

As noted, the battery voltage provided by auxiliary battery 14 is a DC voltage. As such, voltage bus 26 is a DC voltage bus. Vehicle electronic control units typically run on 12 or 24 DC volt systems. ECA 12 is one such module which operates on 12/24 volt battery. ECA 12 operates to open and close clutch 24 such as in response to a request by a transmission control unit (not shown). As further noted, battery power failure scenarios include the battery voltage being too low or too high or loss of battery connection.

Motor 32 of ECA 12 operates both in motoring and generating modes. Battery power failure is to be detected under either operating condition of motor 32.

Figure 3:
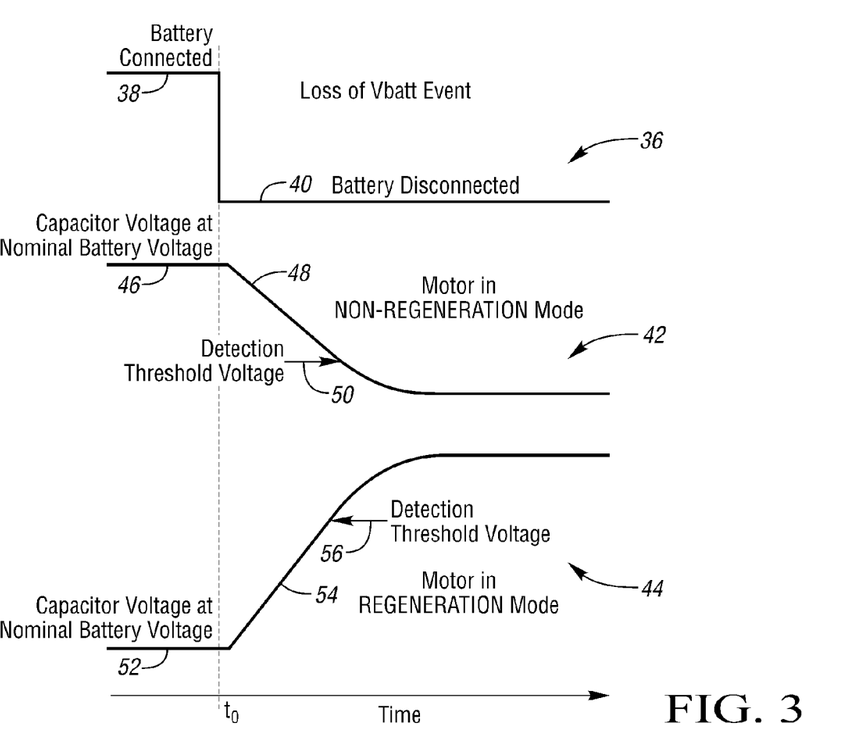
FIG. 3 illustrates plots depicting battery power failure scenarios upon loss of battery connection to the ECA.

Referring now to FIG. 3, with continual reference to FIG. 2, plots depicting battery power failure scenarios upon loss of connection of auxiliary battery 14 to ECA 12 are shown. A battery connection plot 36 depicts a sequence of loss of battery connection (i.e., loss of $V_{batt}$ event). The loss of battery connection occurs at time $t_0$ as shown in plot 36. A connection between ECA 12 and battery 14 is established prior to the time $t_0$ as indicated by plot line 38. The connection between ECA 12 and battery 14 is disconnected after the time $t_0$ as indicated by plot line 40.

A first voltage plot 42 depicts the battery voltage at measurement location 34 prior to and after the loss of battery connection when ECA 12 is in the motoring mode. A second voltage plot 44 depicts the battery voltage at measurement location 34 prior to and after the loss of battery connection when ECA 12 is in the regeneration mode. The battery voltage at measurement location 34 is the voltage of capacitor 28. Thus, first and second voltage plots 42 and 44 depict the voltage of capacitor 28 prior to and after the loss of battery connection when ECA 12 is in the motoring and regeneration modes, respectively.

In general, when battery 14 is connected to inverter 30 of ECA 12, which powers motor 32 of the ECA, capacitor 28 is at the battery voltage. In normal operation, when motor 32 draws battery power from battery 14 to actuate clutch 24, capacitor 28 acts as a filter to absorb current/voltage transients induced by the switching action. In the motoring mode when motor 32 is powering clutch 24, current is sourced from battery 14 to ECA 12 and the voltage of capacitor 28 is at the nominal battery voltage. On the other hand, when motor 32 is in the regeneration mode, current is fed back from ECA 12 to battery 14 and the voltage of capacitor 28 remains at the nominal battery voltage.

First voltage plot 42 depicts the voltage of capacitor 28 when ECA 12 is in the motoring mode. Prior to loss of battery connection, the voltage of capacitor 28 is at the nominal battery voltage as indicated by voltage plot line 46. Upon loss of battery connection, motor current is sourced from capacitor 28 which quickly discharges as indicated by voltage plot line 48. The voltage of capacitor 28 falls below the nominal battery voltage as a result of the discharging. When the voltage of capacitor 28 goes below a threshold voltage 50 (i.e., the battery voltage is too low), the loss of battery connection can be confirmed.

Second voltage plot 44 depicts the voltage of capacitor 28 when ECA 12 is in the regeneration mode. Prior to loss of battery connection, the voltage of capacitor 28 is at the nominal battery voltage as indicated by voltage plot line 52. Upon loss of battery connection, current flows from motor 32 to capacitor 28 which quickly charges as indicated by voltage plot line 54. The voltage of capacitor 28 rises above the nominal battery voltage as a result of the charging. When the voltage of capacitor 28 rises above a threshold voltage 56 (i.e., the battery voltage is too high), the loss of battery connection can be confirmed.

Threshold voltages 50 and 52 for the motoring and regeneration modes are determinable by characterizing the system under different temperature and initial battery voltage conditions to ensure timely detection.

Detecting for battery power failure based on voltage at capacitor 28 in accordance with embodiments of the present invention generally include the following steps: sensing supply voltages; detecting battery voltage level—12 or 24 volts; and detecting loss of battery connection (i.e., detecting loss of $V_{batt}$) based on the battery voltage level. The step of sensing supply voltages includes detecting ignition voltage and the battery voltage. The ignition is connected to a voltage bus powered by auxiliary battery 14. The ignition voltage is measured directly from the ignition connection using a resistor divider and an ADC (not shown). As described above, the battery voltage is measured at measurement location 34 and therefore is the voltage of capacitor 28.

The step of detecting battery voltage level involves detecting whether the battery voltage level is 12 or 24 volts, in this example. As described, the battery voltage measurement is taken on the DC link of inverter 30 (i.e., at measurement location 34 connected to capacitor 28). The DC link voltage decreases in the motoring mode and increases in the regeneration mode. Thus, the battery voltage measurement cannot give the correct nominal battery voltage. Instead, the ignition voltage measurement is used for the battery voltage level detection. The ignition voltage measurement can be used as the ignition voltage is independent of the operating mode of motor 32 of ECA 12. The ignition voltage to ECA 12 is directly derived from the battery voltage without level shifting and is representative of the battery voltage level. The detection is done as follows: (1) monitor the ignition voltage every 1 mSec, for example; (2A) if the measured ignition voltage is more than 18 volts consistently for 3 mSec, for example, then the vehicle battery level is set to 24 volts; and (2B) if the measured ignition voltage is less than 16 volts consistently for 3 mSec, for example, then the vehicle battery level is set to 12 volts. The (2A) case can take into account hysteresis with the ignition voltage increasing and the (2B) case can take into account hysteresis with the ignition voltage decreasing.

The step of detecting loss of battery connection based on the battery voltage level is the subject of the flowcharts illustrated in FIGS. 4A, 4B, 5A, 5B, 6A, and 6B. Another subject of the flowcharts is the step of detecting re-establishment of the battery connection based on the battery voltage level. In general, the flowcharts describe operation of detecting for battery power failure of ECA 12 and detecting for re-establishment of proper battery power to ECA 12 after the occurrence of battery power failure. The operation may be carried out by a controller in communication with ECA 12 and measurement location 34. Such a controller may be external of ECA 12 or a component of the ECA.

Figure 4A:
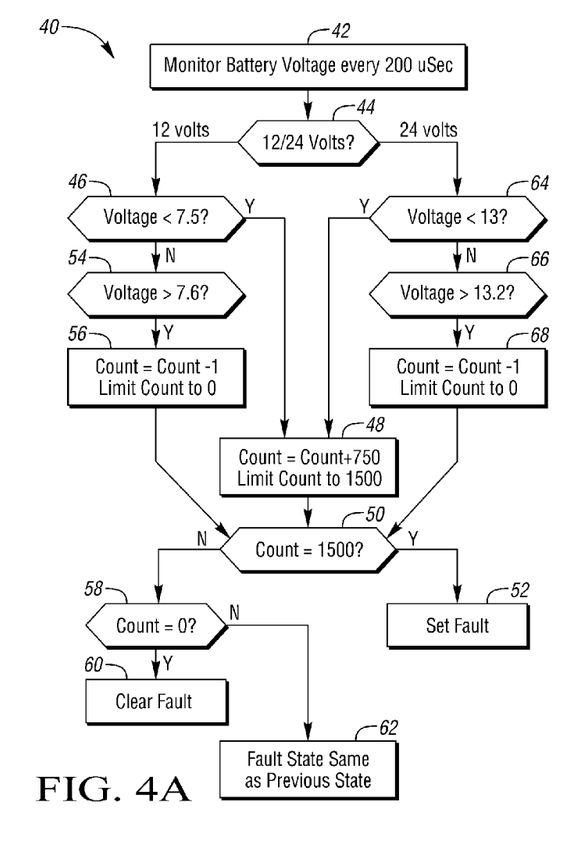
FIG. 4A illustrates a flowchart describing operation of detecting battery power failure of the ECA and detecting re-establishment of proper battery power to the ECA based on the capacitor voltage when the ECA is in a motoring mode in accordance with a first embodiment of the present invention.
Figure 4B:
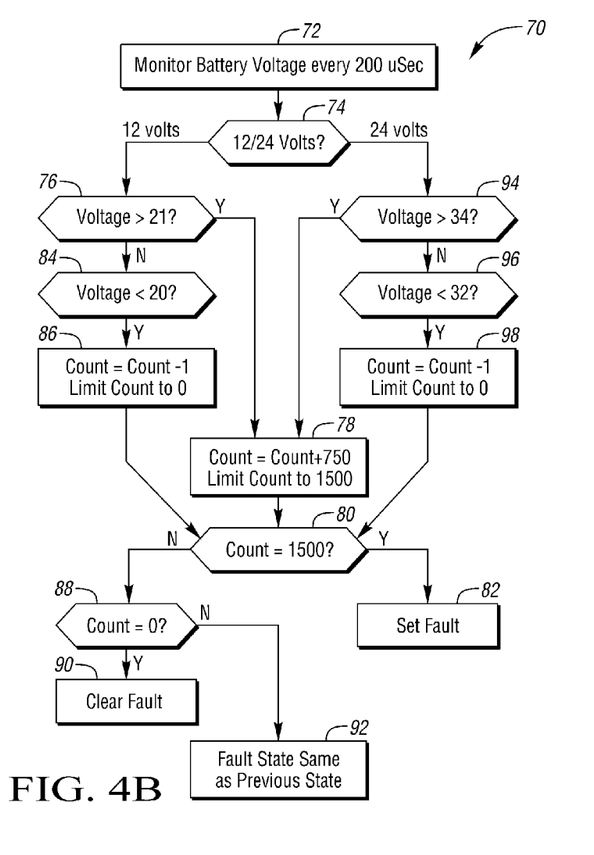
FIG. 4B illustrates a flowchart describing operation of detecting battery power failure of the ECA and detecting re-establishment of proper battery power to the ECA based on the capacitor voltage when the ECA is in a regeneration mode in accordance with the first embodiment of the present invention.
Figure 5A:
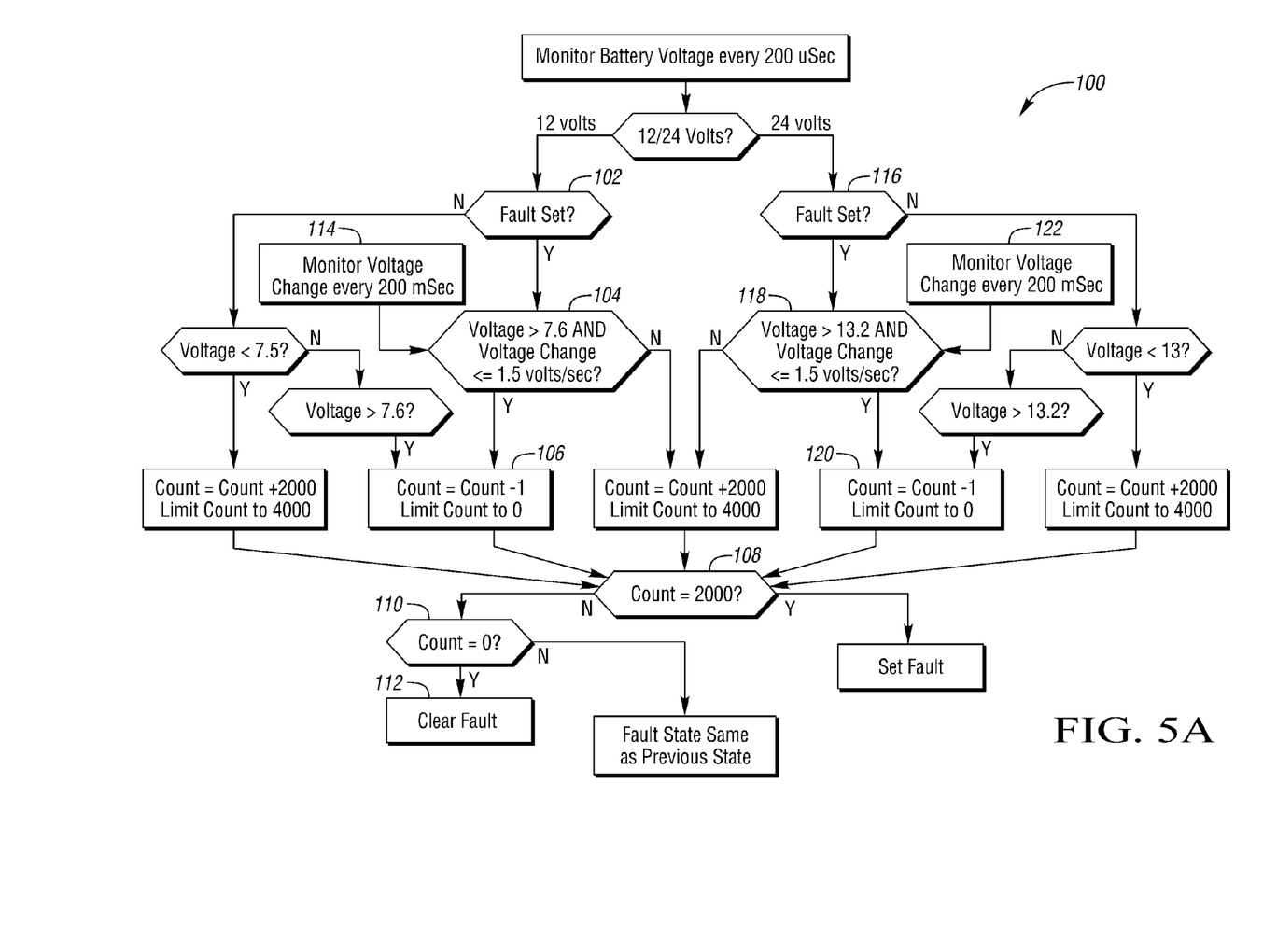
FIG. 5A illustrates a flowchart describing operation of detecting battery power failure of the ECA and detecting re-establishment of proper battery power to the ECA based on the capacitor voltage when the ECA is in the motoring mode in accordance with a first variation of the first embodiment of the present invention.
Figure 5B:
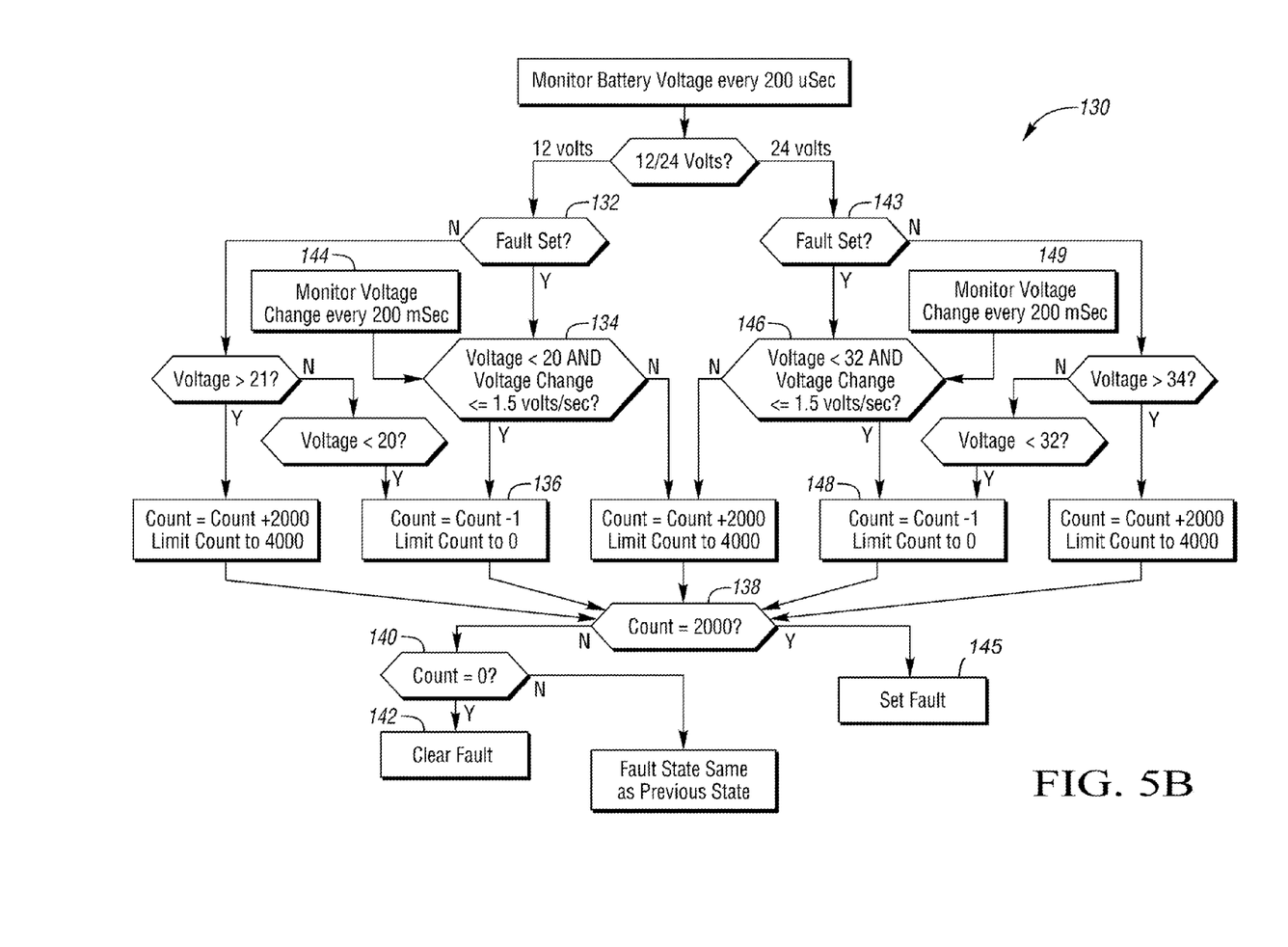
FIG. 5B illustrates a flowchart describing operation of detecting battery power failure of the ECA and detecting re-establishment of proper battery power to the ECA based on the capacitor voltage when the ECA is in the regeneration mode in accordance with the first variation of the first embodiment of the present invention.
Figure 6A:
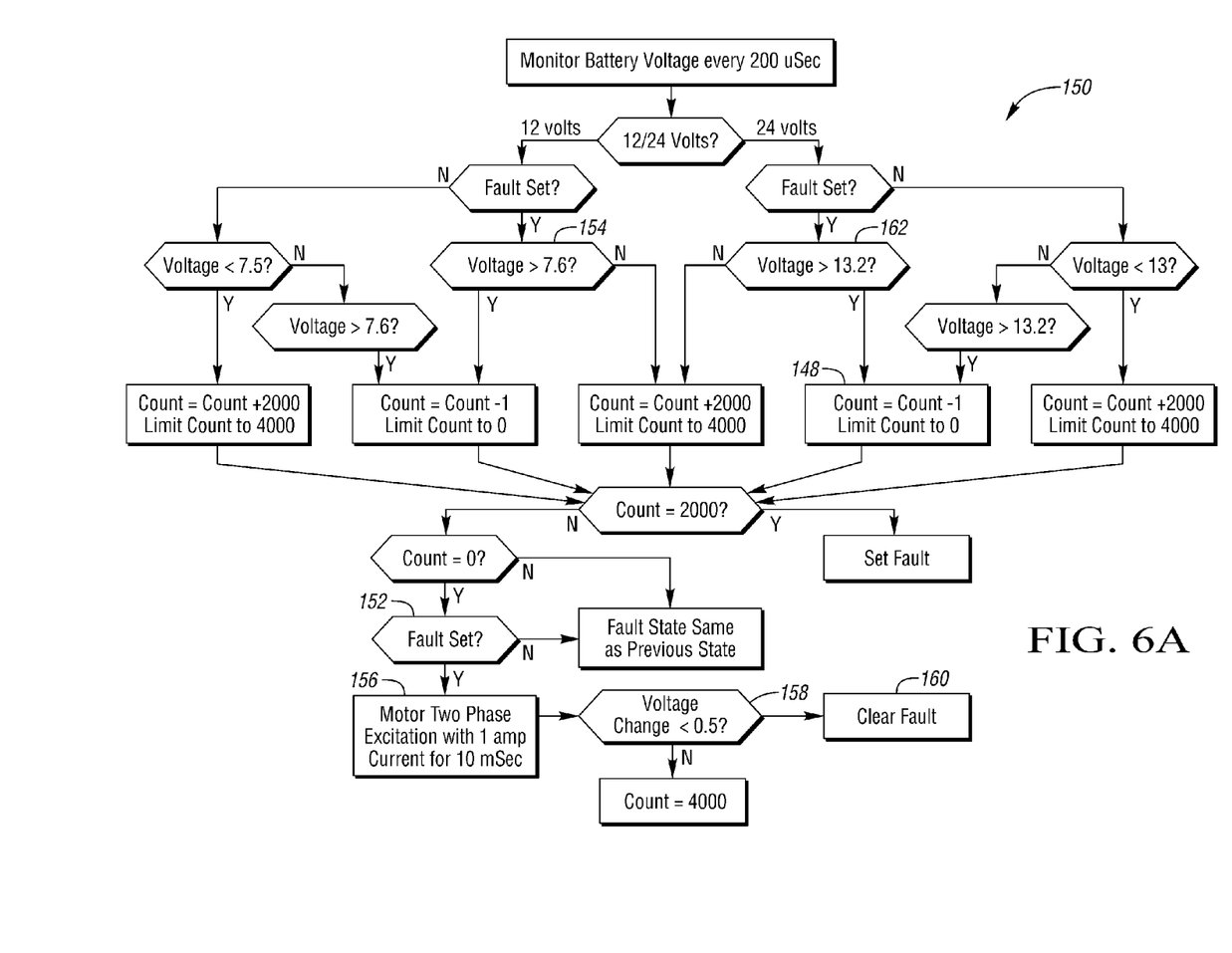
FIG. 6A illustrates a flowchart describing operation of detecting battery power failure of the ECA and detecting re-establishment of proper battery power to the ECA based on the capacitor voltage when the ECA is in the motoring mode in accordance with a second variation of the first embodiment of the present invention.

The flowcharts of FIGS. 4A, 5A, and 6A involve the motoring mode of ECA 12. The flowcharts of FIGS. 4B, 5B, and 6B involve the regeneration mode of ECA 12. The operations depicted in the flowcharts include timing, voltage, and count variables/thresholds which are provided with specific numeric values. Such numeric values are exemplary and are provided to enable a fuller understanding of the operations.

Referring now to FIG. 4A, with continual reference to first voltage plot 42 in FIG. 3, a flowchart 40 describing operation of detecting battery power failure of ECA 12 and detecting re-establishment of proper battery power to the ECA based on voltage of capacitor 28 when the ECA is in the motoring mode in accordance with a first embodiment is shown. The operation begins with measuring the battery voltage at capacitor 28 every 200 microseconds as indicated in block 42. As such, the battery voltage is sampled with the sample size being 200 microseconds. Battery 14 is identified as being a 12 or 24 volt battery based on the measured battery voltage as indicated in block 44.

When battery 14 is identified as being a 12 volt battery in decision block 44, the operation includes the following steps. If the measured battery voltage is less than 7.5 volts consistently for two samples (i.e., 400 microseconds) in decision block 46, then the count is incremented twice by a count value of 750 to reach a limit value of 1500 as indicated in block 48. When decision block 50 determines the count value to reach the limit value a battery power failure fault is set as indicated in block 52 (i.e., the battery voltage is too low). On the other hand, if the measured battery voltage is greater than 7.6 volts consistently for 1500 samples (i.e., 0.3 seconds) in decision block 54, then the count is decremented by one for each sample until the count is zero as indicated in block 56. When decision block 58 determines the count to have reached zero, the battery power failure fault is cleared as indicated in block 60. Until the count reaches zero the battery power failure remains set as indicated in block 62. The clearing of the battery power failure represents the detection of re-establishment of proper battery power to ECA 12. Decision block 46 for detecting whether the battery voltage is too low can take into account hysteresis with the battery voltage decreasing. Likewise, decision block 54 for detecting whether the battery it too high can take into account hysteresis with the battery voltage increasing.

When battery 14 is identified as being a 24 volt battery in decision block 44, the operation includes the following steps. If the measured battery voltage is less than 13 volts consistently for two samples in decision block 64, then the count is incremented twice and the battery power failure fault is set pursuant to blocks 48, 50, and 52 (i.e., the battery voltage is too low). On the other hand, if the measured battery voltage is greater than 13.2 volts consistently for 1500 samples in decision block 66, then the count is decremented by one for each sample until the count is zero as indicated in block 68. When the count reaches zero the battery power failure fault is cleared pursuant to blocks 50, 58, and 60. Again, until the count reaches zero the battery power failure remains set as indicated in block 62. Further, hysteresis of the measured battery voltage can be taken into account as described above.

Referring now to FIG. 4B, with continual reference to second voltage plot 44 in FIG. 3, a flowchart 70 describing operation of detecting battery power failure of ECA 12 and detecting re-establishment of proper battery power to the ECA based on voltage of capacitor 28 when the ECA is in the regeneration mode in accordance with the first embodiment is shown. The operation begins with measuring the battery voltage at capacitor 28 every 200 microseconds as indicated in block 72. Battery 14 is identified as being a 12 or 24 volt battery based on the measured battery voltage as indicated in block 74.

When battery 14 is identified as being a 12 volt battery in decision block 74, the operation includes the following steps. If the measured battery voltage is greater than 21 volts consistently for two samples in decision block 76, then the count is incremented twice and the battery power failure fault is set pursuant to blocks 78, 80, and 82 (i.e., the battery voltage is too high). If the measured battery voltage is less than 20 volts consistently for 1500 samples in decision block 84, then the count is decremented by one for each sample until the count is zero as indicated in block 86. When the count reaches zero the battery power failure fault is cleared pursuant to blocks 80, 88, and 90. Until the count reaches zero the battery power failure remains set as indicated in block 92. Again, the clearing of the battery power failure represents the detection of re-establishment of proper battery power to ECA 12 and hysteresis of the measured battery voltage can be taken into account.

When battery 14 is identified as being a 24 volt battery in decision block 74, the operation includes the following steps. If the measured battery voltage is greater than 34 volts consistently for two samples in decision block 94, then the count is incremented twice and the battery power failure fault is set pursuant to blocks 78, 80, and 82 (i.e., the battery voltage is too high). If the measured battery voltage is less than 32 volts consistently for 1500 samples in decision block 96, then the count is decremented by one for each sample until the count is zero as indicated in block 98. When the count reaches zero the battery power failure fault is cleared pursuant to blocks 80, 88, and 90. Again, until the count reaches zero the battery power failure remains set as indicated in block 92 and hysteresis of the measured battery voltage can be taken into account as described above.

As described, in addition to including steps for detecting a battery power failure fault, the operation depicted in flowcharts 40 and 70 of FIGS. 4A and 4B further include steps for clearing a battery power failure fault (i.e., steps for the detection of re-establishment of proper battery power to ECA 12 after a battery power failure was detected). In the case of the motoring mode described in FIG. 4A, the criteria for clearing a battery power failure fault included the measured battery voltage being greater than a threshold voltage consistently for a time period such as 1500 samples. Correspondingly, in the case of the regeneration mode described in FIG. 4B, the criteria for clearing a battery power failure fault included the measured battery voltage being less than a threshold voltage consistently for a time period such as 1500 samples.

Other criteria for clearing a battery power failure fault are employed in accordance with embodiments of the present invention. As will be described, the operation described in FIGS. 5A and 5B include a strategy for clearing a battery power failure fault as a function of the rate of decay of the battery voltage. The operation described in FIGS. 6A and 6B include a strategy for clearing a battery power failure fault as a function of the change of battery voltage upon shorting the capacitor charge through the windings of motor 32 of ECA 12.

Clearing a battery power failure fault as a function of the rate of decay of the battery voltage pursuant to the operation described in FIGS. 5A and 5B overcomes an issue related to energizing the motor brake of ECA 12 when the threshold voltages come to within normal operating range after a battery power failure. Once a battery power failure (i.e., loss of $V_{batt}$) has taken place and clutch 24 is closing the voltage of capacitor 28 rises up sharply. In addition, if the motor brake is intended to be energized, then after the battery power failure detection has taken place the motor brake is de-energized. After the rotor of motor 32 stops moving, the voltage of capacitor 28 starts to bleed off. If the voltage comes within normal operating range, then the motor brake can be energized even though a physical loss of $V_{batt}$ has taken place.

In general, the operation for clearing a battery power failure fault as a function of the rate of decay of battery voltage includes measuring the rate of decay of battery voltage and if the decay is less than a threshold for a given duration for 12/24 volt systems then the fault is cleared. The rate of change of battery voltage is slow when the battery connection is present. The fault can therefore be cleared when the rate of change of battery voltage is slow as the slow rate of change is indicative of the battery connection being present. The steps will now be described in greater detail with respect to FIGS. 5A and 5B.

Referring now to FIG. 5A, with continual reference to first voltage plot 42 in FIG. 3 and FIG. 4A, a flowchart 100 describing operation of detecting battery power failure of ECA 12 and detecting re-establishment of proper battery power to the ECA based on voltage of capacitor 28 when the ECA is in the motoring mode in accordance with a first variation of the first embodiment is shown. The operation steps illustrated in flowchart 100 for setting a battery power failure fault (i.e., battery voltage too low in the motoring mode) have been described with reference to FIG. 4A. As such, only the operation steps illustrated in flowchart 100 for clearing a battery power failure fault will be described in detail.

When battery 14 is identified as being a 12 volt battery and a battery power failure fault is detected to be set in decision block 102, the operation for clearing the battery power failure fault includes the following steps. If the measured battery voltage is greater than 7.6 volts and the rate of change in the battery voltage is less than 1.5 volts/sec consistently for 800 mSec (for example) in decision block 104, then the battery power failure fault is cleared pursuant to blocks 106, 108, 110, and 112. As the change in battery voltage cannot be reliably detected at 200 microsecond rate, in this example, due to ADC measurement resolution, the calculation is carried out every 200 mSec as indicated in block 114. The described voltage change check condition is used only when the battery power failure fault is set. Further, decision block 104 can take into account hysteresis with the battery voltage increasing.

Similarly, when battery 14 is identified as being a 24 volt battery and a battery power failure fault is detected to be set in decision block 116, the operation for clearing the battery power failure fault includes the following steps. If the measured battery voltage is greater than 13.2 volts and the rate of change in the battery voltage is less than 1.5 volts/sec consistently for 800 mSec in decision block 118, then the battery power failure fault is cleared pursuant to blocks 120, 108, 110, and 112. Again, as the change in battery voltage cannot be reliably detected at 200 microsecond rate, the calculation is carried out every 200 mSec as indicated in block 122. The described voltage change check condition is used only when the battery power failure fault is set and decision block 118 can take into account hysteresis with the battery voltage increasing.

Referring now to FIG. 5B, with continual reference to second voltage plot 44 in FIG. 3 and FIG. 4B, a flowchart 130 describing operation of detecting battery power failure of ECA 12 and detecting re-establishment of proper battery power to the ECA based on voltage of capacitor 28 when the ECA is in the regeneration mode in accordance with a first variation of the first embodiment is shown. The operation steps illustrated in flowchart 130 for setting a battery power failure fault (i.e., battery voltage too high in the regeneration mode) have been described with reference to FIG. 4B. As such, only the operation steps illustrated in flowchart 130 for clearing a battery power failure fault will be described in detail.

When battery 14 is identified as being a 12 volt battery and a battery power failure fault is detected to be set in decision block 132, the operation for clearing the battery power failure fault includes the following steps. If the measured battery voltage is less than 20 volts and the rate of change in the battery voltage is less than 1.5 volts/sec consistently for 800 mSec in decision block 134, then the battery power failure fault is cleared pursuant to blocks 136, 138, 140, and 142. As the change in battery voltage cannot be reliably detected at 200 microsecond rate, the calculation is carried out every 200 mSec as indicated in block 144. The described voltage change check condition is used only when the battery power failure fault is set and decision block 134 can take into account hysteresis with the battery voltage decreasing.

Similarly, when battery 14 is identified as being a 24 volt battery and a battery power failure fault is detected to be set in decision block 145, the operation for clearing the battery power failure fault includes the following steps. If the measured battery voltage is less than 32 volts and the rate of change in the battery voltage is less than 1.5 volts/sec consistently for 800 mSec in decision block 146, then the battery power failure fault is cleared pursuant to blocks 148, 138, 140, and 142. Again, as the change in battery voltage cannot be reliably detected at 200 microsecond rate, the calculation is carried out every 200 mSec as indicated in block 149. The described voltage change check condition is used only when the battery power failure fault is set and decision block 145 can take into account hysteresis with the battery voltage decreasing.

As such, the operation described in FIGS. 5A and 5B employ criteria for clearing a battery power failure fault based on the rate of decay of the battery voltage. As indicated above, the operation described in FIGS. 6A and 6B employ other criteria. In particular, the operation described in FIGS. 6A and 6B include clearing a battery power failure fault based on the change of battery voltage upon shorting the capacitor charge through the windings of motor 32 of ECA 12.

Figure 6B:
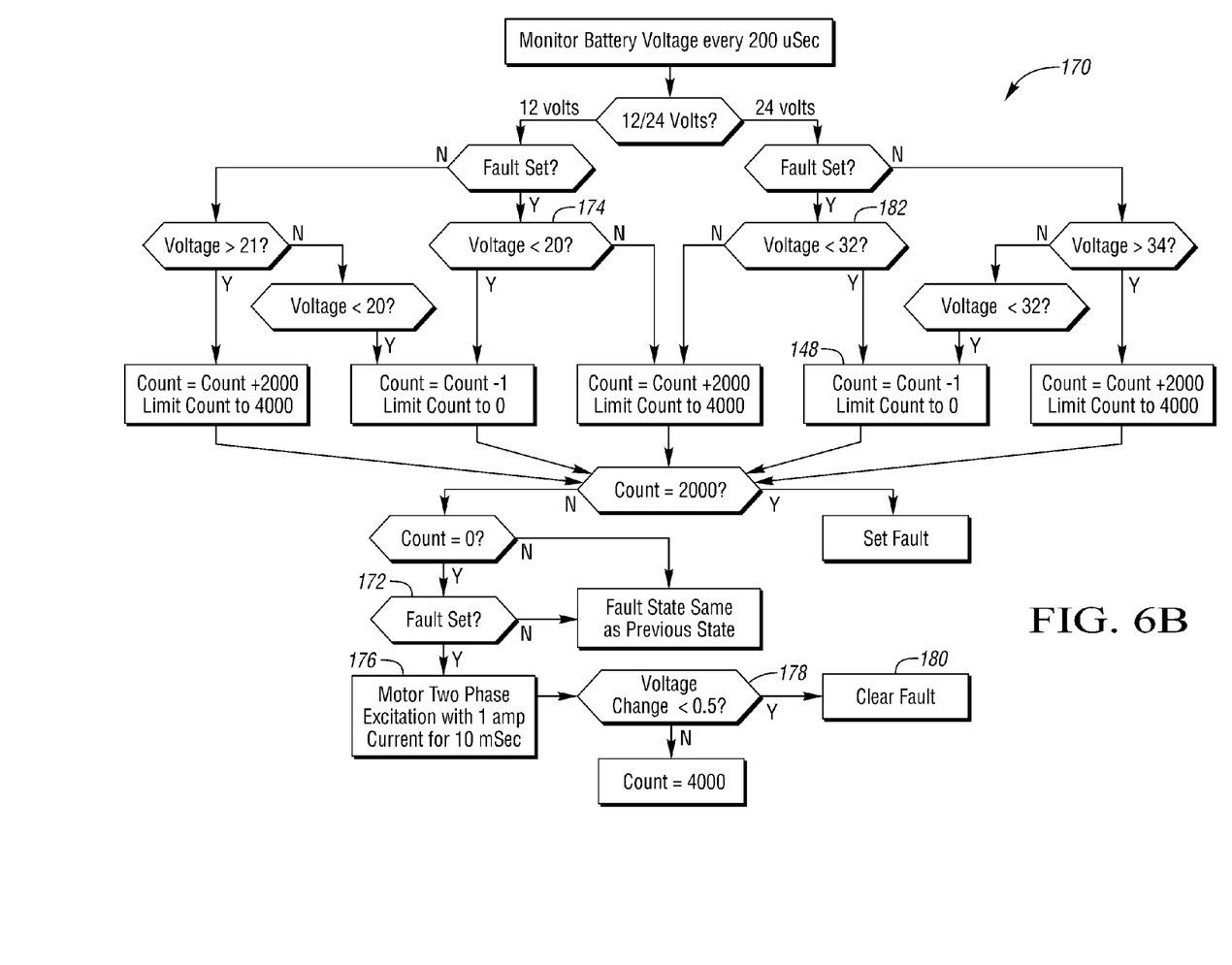
FIG. 6B illustrates a flowchart describing operation of detecting battery power failure of the ECA and detecting re-establishment of proper battery power to the ECA based on the capacitor voltage when the ECA is in the regeneration mode in accordance with the second variation of the first embodiment of the present invention.

Clearing a battery power failure fault based on the change of battery voltage upon shorting the capacitor charge through the motor windings pursuant to the operation described in FIGS. 6A and 6B also overcomes the noted issue related to energizing the motor brake of ECA 12. This issue comes into play when the threshold voltages come to within normal operating range after a battery power failure. Again, once a battery power failure (i.e., loss of $V_{batt}$) has taken place and clutch 24 is closing the voltage of capacitor 28 rises up sharply. In addition, if the motor brake is intended to be energized, then after the battery power failure detection has taken place the motor brake is de-energized. After the rotor of motor 32 stops moving, the voltage of capacitor 28 starts to bleed off. If the voltage comes within normal operating range, then the motor brake can be energized even though a physical loss of $V_{batt}$ has taken place.

In general, the operation for clearing a battery power failure fault based on the change of battery voltage upon shorting the capacitor charge through the motor windings includes measuring the change of battery voltage when motor 32 is energized and drawing current through the charged-up capacitor 28. The change of battery voltage will be low when the battery connection is present. The fault can therefore be cleared when the change of battery voltage is low as the low change is indicative of the battery connection being present. The steps will now be described in greater detail with respect to FIGS. 6A and 6B.

Referring now to FIG. 6A, with continual reference to first voltage plot 42 in FIG. 3 and FIG. 4A, a flowchart 150 describing operation of detecting battery power failure of ECA 12 and detecting re-establishment of proper battery power to the ECA based on voltage of capacitor 28 when the ECA is in the motoring mode in accordance with a second variation of the first embodiment is shown. The operation steps illustrated in flowchart 150 for setting a battery power failure fault (i.e., battery voltage too low in the motoring mode) have been described with reference to FIG. 4A. As such, only the operation steps of illustrated in flowchart 150 for clearing a battery power failure fault will be described in detail.

When battery 14 is identified as being a 12 volt battery and a battery power failure fault is detected to be set in decision block 152, the operation for clearing the battery power failure fault includes the following steps. If the measured battery voltage is greater than 7.6 volts for 800 mSec in decision block 154, then motor 32 is run in two phase excitation with 1 amp current for 10 mSec (for example) as indicated in block 156. If the change in voltage of the battery voltage before and after the two phase excitation is detected to be less than 0.5 volts in decision block 158, then the battery power failure fault is cleared pursuant as indicated in block 160. Decision block 154 can take into account hysteresis with the battery voltage increasing.

Similarly, when battery 14 is identified as being a 24 volt battery and a battery power failure fault is detected to be set in decision block 152, the operation for clearing the battery power failure fault includes the following steps. If the measured battery voltage is greater than 13.2 volts for 800 mSec in decision block 162, then motor 32 is run in two phase excitation with 1 amp current for 10 mSec (for example) as indicated in block 156. If the change in voltage of the battery voltage before and after the two phase excitation is detected to be less than 0.5 volts in decision block 158, then the battery power failure fault is cleared pursuant as indicated in block 160. Decision block 162 can take into account hysteresis with the battery voltage increasing.

Referring now to FIG. 6B, with continual reference to second voltage plot 44 in FIG. 3 and FIG. 4B, a flowchart 170 describing operation of detecting battery power failure of ECA 12 and detecting re-establishment of proper battery power to the ECA based on voltage of capacitor 28 when the ECA is in the regeneration mode in accordance with a second variation of the first embodiment is shown. The operation steps illustrated in flowchart 170 for setting a battery power failure fault (i.e., battery voltage too high in the regeneration mode) have been described with reference to FIG. 4B. As such, only the operation steps of illustrated in flowchart 170 for clearing a battery power failure fault will be described in detail.

When battery 14 is identified as being a 12 volt battery and a battery power failure fault is detected to be set in decision block 172, the operation for clearing the battery power failure fault includes the following steps. If the measured battery voltage is less than 20 volts for 800 mSec in decision block 174, then motor 32 is run in two phase excitation with 1 amp current for 10 mSec (for example) as indicated in block 176. If the change in voltage of the battery voltage before and after the two phase excitation is detected to be less than 0.5 volts in decision block 178, then the battery power failure fault is cleared pursuant as indicated in block 180. Decision block 174 can take into account hysteresis with the battery voltage decreasing.

Similarly, when battery 14 is identified as being a 24 volt battery and a battery power failure fault is detected to be set in decision block 172, the operation for clearing the battery power failure fault includes the following steps. If the measured battery voltage is less than 32 volts for 800 mSec in decision block 182, then motor 32 is run in two phase excitation with 1 amp current for 10 mSec (for example) as indicated in block 176. If the change in voltage of the battery voltage before and after the two phase excitation is detected to be less than 0.5 volts in decision block 178, then the battery power failure fault is cleared pursuant as indicated in block 180. Decision block 182 can take into account hysteresis with the battery voltage decreasing.

As described above, timely detection of loss of battery power to ECA 12 is desirable as the powertrain should be operated in a fall back mode for the vehicle to be brought to an acceptable and safe operating condition. In addition, the motor brake of ECA 12 is to be brought to a state depending on the "power fail mode" set by the system controller, which requires appropriate activation of power switches in a timely manner. Embodiments of the present invention eliminate the need for current sensors on DC voltage bus 26 and complex switching circuits, thereby helping realize potential cost savings.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for an electric clutch actuator (ECA) comprising:
    connecting a capacitor to the ECA such that when the ECA and a battery configured to output a battery voltage are connected together a capacitor voltage matches the battery voltage and when the ECA and the battery are disconnected from one another the capacitor voltage differs from the battery voltage; and
    detecting a loss of battery connection upon a difference between the capacitor voltage and the battery voltage exceeding a threshold.

2. The method of claim 1 further comprising:
    detecting re-establishment of the battery connection upon the difference between the capacitor voltage and the battery voltage being less than the threshold for a duration after a loss of battery connection was detected.

3. The method of claim 1 further comprising:
    detecting re-establishment of the battery connection upon the difference between the capacitor voltage and the battery voltage being less than the threshold and a rate of change of the capacitor voltage being less than a rate threshold for a duration after a loss of battery connection was detected.

4. The method of claim 1 further comprising:
    detecting re-establishment of the battery connection upon the difference between the capacitor voltage and the battery voltage being less than the threshold and a change of the capacitor voltage caused in response to motor excitation of the ECA being less than a change threshold after a loss of battery connection was detected.

5. The method of claim 1 further comprising:
    operating the ECA in a motoring mode in which the ECA consumes power such that during loss of battery connection the capacitor voltage falls; and
    detecting a loss of battery connection upon the capacitor voltage falling lower than a low threshold.

6. The method of claim 5 further comprising:
    detecting re-establishment of the battery connection upon the capacitor voltage being greater than the low threshold for a duration after a loss of battery connection was detected.

7. The method of claim 5 further comprising:
detecting re-establishment of the battery connection upon the capacitor voltage being greater than the low threshold and a rate of change of the capacitor voltage being less than a rate threshold for a duration after a loss of battery connection was detected.

8. The method of claim 5 further comprising:
detecting re-establishment of the battery connection upon the capacitor voltage being greater than the low threshold and a change of the capacitor voltage caused in response to motor excitation of the ECA being less than a change threshold after a loss of battery connection was detected.

9. The method of claim 1 further comprising:
operating the ECA in a regeneration mode in which the ECA supplies power such that during loss of battery connection the capacitor voltage rises; and
detecting a loss of battery connection upon the capacitor voltage rising greater than a high threshold.

10. The method of claim 9 further comprising:
detecting re-establishment of the battery connection upon the capacitor voltage being lower than the high threshold for a duration after a loss of battery connection was detected.

11. The method of claim 9 further comprising:
detecting re-establishment of the battery connection upon the capacitor voltage being lower than the high threshold and a rate of change of the capacitor voltage being less than a rate threshold for a duration after a loss of battery connection was detected.

12. The method of claim 9 further comprising:
detecting re-establishment of the battery connection upon the capacitor voltage being lower than the high threshold and a change of the capacitor voltage caused in response to motor excitation of the ECA being less than a change threshold after a loss of battery connection was detected.

13. The method of claim 1 wherein:
connecting the capacitor to the ECA includes connecting the capacitor and the ECA to a voltage bus configured to provide the battery voltage when the battery is connected to the voltage bus.

14. The method of claim 13 wherein:
connecting the capacitor to the ECA includes connecting the capacitor and the ECA in parallel to one another to the voltage bus such that the capacitor is connected between the battery and the ECA when the battery is connected to the voltage bus.

15. A system comprising:
an electric clutch actuator (ECA) operable to actuate a clutch;
a capacitor connected to the ECA such that when the ECA and a battery configured to output a battery voltage are connected together a capacitor voltage matches the battery voltage and when the ECA and the battery are disconnected from one another the capacitor voltage differs from the battery voltage; and
a controller configured to detect a loss of battery connection upon a difference between the capacitor voltage and the battery voltage exceeding a threshold.

16. The system of claim 15 wherein:
the controller is further configured to detect re-establishment of the battery connection upon the difference between the capacitor voltage and the battery voltage being less than the threshold after a loss of battery connection was detected.

17. The system of claim 15 wherein:
the ECA is operable in a motoring mode in which the ECA consumes power such that during loss of battery connection the capacitor voltage falls; and
the controller is further configured to detect a loss of battery connection upon the capacitor voltage falling lower than a low threshold.

18. The system of claim 15 wherein:
the ECA is operable in a regeneration mode in which the ECA supplies power such that during loss of battery connection the capacitor voltage rises; and
the controller is further configured to detect a loss of battery connection upon the capacitor voltage rising greater than a high threshold.

19. The system of claim 15 further comprising:
a voltage bus configured to provide the battery voltage when the battery is connected to the voltage bus; and
wherein the capacitor and the ECA are connected to the voltage bus.

20. The system of claim 19 wherein:
the capacitor and the ECA are connected in parallel to one another to the voltage bus such that the capacitor is connected between the battery and the ECA when the battery is connected to the voltage bus.

* * * * *